(12) United States Patent
Yang

(10) Patent No.: US 10,031,553 B2
(45) Date of Patent: Jul. 24, 2018

(54) ELECTRONIC DEVICE HAVING NOISE BLOCKING STRUCTURE

(71) Applicant: Samsung Electronics Co., Ltd., Suwon-si, Gyeonggi-do (KR)

(72) Inventor: Dong-Il Yang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 236 days.

(21) Appl. No.: 15/101,293

(22) PCT Filed: Nov. 26, 2014

(86) PCT No.: PCT/KR2014/011405
§ 371 (c)(1),
(2) Date: Jun. 2, 2016

(87) PCT Pub. No.: WO2015/083976
PCT Pub. Date: Jun. 11, 2015

(65) Prior Publication Data
US 2016/0306391 A1    Oct. 20, 2016

(30) Foreign Application Priority Data

Dec. 6, 2013    (KR) ........................ 10-2013-0151703

(51) Int. Cl.
*G06F 1/16*    (2006.01)
*G06F 3/041*    (2006.01)
(Continued)

(52) U.S. Cl.
CPC .......... *G06F 1/1643* (2013.01); *G06F 1/1626* (2013.01); *G06F 1/1658* (2013.01);
(Continued)

(58) Field of Classification Search
CPC ...... G06F 3/041; G06F 1/1626; G06F 1/1643; G06F 1/1658; G06F 1/182;
(Continued)

(56) References Cited

U.S. PATENT DOCUMENTS 4,034,298 A    7/1977    McFadyen et al.
4,050,022 A    9/1977    McFadyen et al.
(Continued)

FOREIGN PATENT DOCUMENTS

KR    10-2013-0025714 A    3/2013

*Primary Examiner* — Adrian S Wilson
(74) *Attorney, Agent, or Firm* — Jefferson IP Law, LLP

(57) ABSTRACT

Various embodiments of the present invention relate to an electronic device having a noise blocking structure comprising: a first electronic component including a noise source; a first connecting portion disposed on one side of the noise source and grounded to a first grounded portion; and a second connecting portion disposed on the other side (such that the noise source is between the second connecting portion and the first connecting portion) and grounded to a second grounded portion. By means of a first grounded region formed by the first connecting portion and a second grounded region formed by the second connecting portion, the noise generated from the noise source is prevented from emanating at least to a second electronic component nearby so as to prevent a degradation in the performance of nearby electronic components.

19 Claims, 4 Drawing Sheets

(51) Int. Cl.
*H04M 1/02* (2006.01)
*G06F 1/18* (2006.01)

(52) U.S. Cl.
CPC .............. *G06F 1/182* (2013.01); *G06F 3/041* (2013.01); *H04M 1/0266* (2013.01); *G06F 2203/04103* (2013.01); *H04M 2250/22* (2013.01)

(58) Field of Classification Search
CPC ...... G06F 2203/04103; H04M 1/0266; H04M 2250/22
See application file for complete search history.

(56) References Cited

U.S. PATENT DOCUMENTS

| | | |
|---|---|---|
| 4,225,823 A | 9/1980 | Ogita |
| 4,461,034 A | 7/1984 | Ida |
| 4,466,128 A | 8/1984 | Couvillon |
| 4,605,927 A | 8/1986 | Katz et al. |
| 4,653,117 A | 3/1987 | Heck |
| 4,775,995 A | 10/1988 | Chapman et al. |
| 4,893,316 A | 1/1990 | Janc et al. |
| 5,048,962 A | 9/1991 | Kurokawa et al. |
| 5,239,302 A | 8/1993 | Maeda et al. |
| 5,303,411 A | 4/1994 | Stengel et al. |
| 5,367,539 A | 11/1994 | Copley |
| 5,450,622 A | 9/1995 | Vandegraaf |
| 5,477,226 A | 12/1995 | Hager et al. |
| 5,761,485 A | 6/1998 | Munyan |
| 7,509,141 B1 | 3/2009 | Koenck et al. |
| 2004/0006265 A1 | 1/2004 | Alhussiny |
| 2004/0039497 A1 | 2/2004 | Wood et al. |
| 2004/0114062 A1* | 6/2004 | Nishio .............. G02F 1/133308 349/58 |
| 2005/0030233 A1 | 2/2005 | Kim et al. |
| 2005/0069051 A1 | 3/2005 | Lourens |
| 2005/0179531 A1 | 8/2005 | Tabe |
| 2006/0044745 A1* | 3/2006 | Kim .................... G06F 1/1601 361/679.22 |
| 2008/0248770 A1 | 10/2008 | Schultz et al. |
| 2012/0147573 A1 | 6/2012 | Lim et al. |
| 2012/0257694 A1 | 10/2012 | Balakrishnan |
| 2012/0326990 A1 | 12/2012 | Wurzel et al. |
| 2012/0331592 A1 | 12/2012 | Ohnesorge |
| 2013/0057337 A1 | 3/2013 | Kang |
| 2013/0133947 A1 | 5/2013 | Miller |

* cited by examiner

ELECTRONIC DEVICE HAVING NOISE BLOCKING STRUCTURE

CROSS-REFERENCE TO RELATED APPLICATION(S)

This application is a U.S. National Stage application under 35 U.S.C. § 371 of an International application filed on Nov. 26, 2014 and assigned application number PCT/KR2014/011405, which claims the benefit of a Korean patent application filed on Dec. 6, 2013 in the Korean Intellectual Property Office and assigned Ser. No. 10-2013-0151703, the entire disclosures of which are hereby incorporated by reference.

TECHNICAL FIELD

Various embodiments of the present invention relate to an electronic device that includes a noise blocking structure.

BACKGROUND ART

With the development of multimedia technologies, electronic devices having various functions have appeared. Such electronic devices generally have a convergence function that compositely performs one or more functions.

The electronic devices include a large screen touch-type display module. In addition to a basic function, which is the so-called communication with a counterpart, the electronic devices may photograph a still image or a moving image since the electronic devices are provided with a high-pixel camera module. The electronic devices may reproduce multimedia contents, such as music or a moving image, and may be connected to a network in order to surf the web. The electronic devices may include a corresponding antenna module in order to receive terrestrial broadcasting or radio broadcasting. Such electronic devices have been advanced to more rapidly perform various convergence functions by being gradually provided with a high performance processor, and the electronic devices have been remarkably developed to such an extent that the main function, which is the so-called communication with a counterpart, is rather regarded as an additional function.

While the functions of the above-described electronic devices are diversified, an advantage in portability will make the electronic devices more competitive. Users tend to prefer electronic devices that are lighter in weight and smaller in size, even if the electronic devices have the same functions. Accordingly, in practice, electronic device manufacturers release electronic devices that are more slimmed and are lighter in weight and smaller in size compared with the other products while being equal or somewhat superior to the other products in functionality.

As the electronic devices are gradually slimmed while being additionally provided with various functions, a mutual noise interference may occur due to the short distance between electronic components in the electronic devices, and the manufacturers make efforts to prevent such mutual interference.

DETAILED DESCRIPTION OF THE INVENTION

Technical Problem

Various embodiments of the present invention may provide an electronic device that has a noise blocking structure.

Various embodiments of the present invention may provide an electronic device that has a noise blocking structure that is implemented to prevent the performance degradation of the electronic device, and as a result, to secure the reliability of the electronic device.

Various embodiments of the present invention may provide an electronic device that includes a noise blocking structure that is implemented to block, in advance, noise occurring from a touch screen module, and thus to prevent the performance degradation of peripheral electronic components.

Technical Solution

Various embodiments of the present invention may provide an electronic device including: a touch screen device including a noise source; a first connecting portion disposed at one side of the noise source, and grounded to a first ground portion; and a second connecting portion grounded to a second ground portion and disposed at another side of the noise source such that the noise source is interposed therebetween. The noise radiated from the noise source is blocked from being radiated to at least one peripheral electronic component by a first ground region formed by the first connecting portion and a second ground region formed by the second connecting portion.

Various embodiments of the present invention may provide an electronic device including: a first electronic component including a noise source; a first connecting portion disposed at one side of the noise source, and grounded to a first ground portion; and a second connecting portion grounded to a second ground portion and disposed at another side of the noise source such that the noise source is interposed therebetween. The noise radiated from the noise source is blocked from being radiated to at least one peripheral second electronic component by a first ground region formed by the first connecting portion and a second ground region formed by the second connecting portion.

Various embodiments of the present invention may provide an electronic device including: a touch panel including a first noise source; a display module coupled to the touch panel and including a second noise source; a first connecting portion drawn out from one side of the first noise source of the touch panel to be electrically connected to a ground portion of the display module; and a second connecting portion is drawn out from another side of the touch panel and electrically connected to the ground portion of the display module such that the first noise source of the touch panel and the second noise source of the display module are interposed therebetween. The noise radiated from the first and second noise sources is blocked from being radiated to at least one peripheral electronic component by a first ground region formed by the first connecting portion and a second ground region formed by the second connecting portion.

Advantageous Effects

According to various embodiments of the present invention, it is possible to contribute to the slimming of an electronic device while maintaining the excellent performance of the electronic device by preventing, in advance, noise, which occurs from an electronic component, from degrading the performance of peripheral electronic components. Consequently, it is possible to contribute to the securing of the reliability of the electronic device.

MODE FOR CARRYING OUT THE INVENTION

Figure 1:
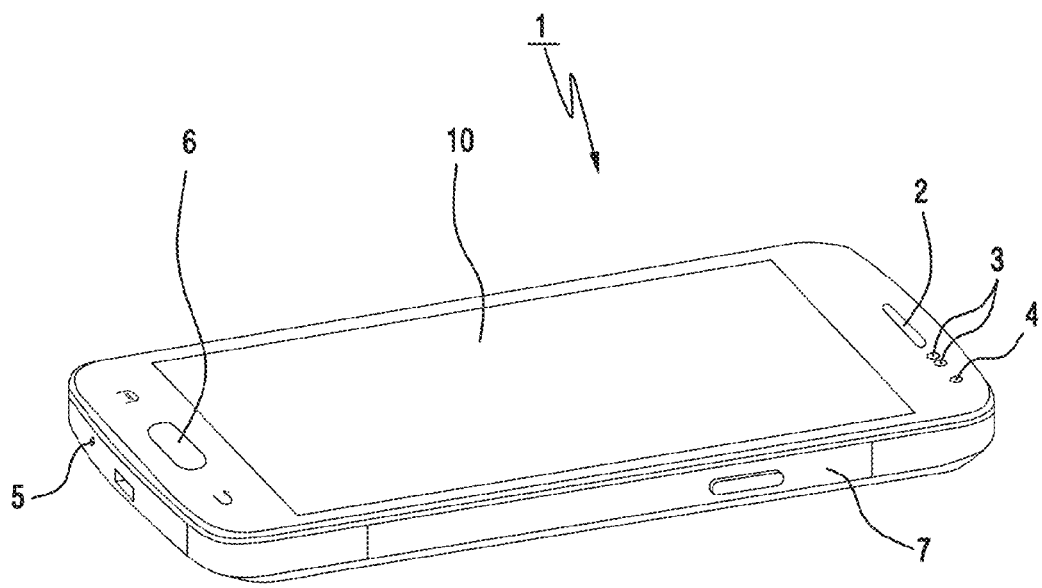
FIG. 1 is a perspective view illustrating an electronic device that includes a touch screen device according to various embodiments of the present invention.

Hereinafter, various embodiments of the present invention will be described in detail with reference to the accompanying drawings. Further, in the following description of the present invention, a detailed description of known functions and configurations incorporated herein will be omitted when it may make the subject matter of the present invention rather unclear. The terms which will be described below are terms defined in consideration of the functions in the present invention, and may be different according to users, intentions of the users, or customs. Therefore, the definition should be made based on the overall contents of the present specification.

For various embodiments of the present invention, a portable communication electronic device including a display module is illustrated in the drawings and will be described below. However, various embodiments of the present invention are not limited thereto, and are applicable to various electronic devices including a display module.

Various embodiments of the present invention will be described with reference to a touch screen device in which a touch panel is included in a display module. However, various embodiments of the present invention are also applicable to an electronic device that includes a display module to which a Liquid Crystal Display (LCD) unit is applied alone.

While various embodiments of the present invention are described with reference to a configuration for preventing the performance degradation of peripheral electronic components that is caused by noise generated from a noise source of a touch screen device, the various embodiments of the present invention are not limited thereto. For example, various embodiments of the present invention are applicable to various electronic components that are capable of shielding noise generated from a noise source of at least one electronic component, even if the electronic component is not a touch screen device.

Various embodiments of the present invention are applicable to various electronic devices configured such that noise generated from one or more electronic components may influence other peripheral electronic components (e.g., a Personal Digital Assistant (PDA), a laptop computer, a mobile phone, a smart phone, a net-book computer, a Mobile Internet Device (MID), an Ultra Mobile PC (UMPC), a tablet personal computer, a navigation system, an MP3, and a wearable device).

FIG. 1 is a perspective view illustrating an electronic device that includes a touch screen device according to various embodiments of the present invention.

Referring to FIG. 1, a touch screen device 10 may be provided on the front face of an electronic device 1, a speaker device 2 may be disposed above the touch screen device 10 so as to receive a voice of a counterpart, and a microphone device 5 may be provided below the touch screen device 10 so as to transmit a voice to the counterpart so that the electronic device is able to perform a basic communication function.

According to various embodiments, various components for conducting various functions of the electronic device 1 may be disposed around the speaker device 2 of the electronic device 1. As one of the components, an image communication camera device 4 may be provided so as to perform Video Telephony (VT) with the counterpart. In addition, one or more sensor devices 3 may be provided so as to variably operate the electronic device 1 according to a peripheral environment. The sensor devices 3 may include, for example, an illuminance sensor configured to detect peripheral illuminance and to automatically adjust the brightness of the display according to the detected illuminance value and/or a proximity sensor configured to sense whether the electronic device 1 is attached to the user's head portion during conversation, and to deactivate the touch screen device 10 when it is sensed that the electronic device 1 is attached to the user's head portion. According to one embodiment, a physical key button 6 may be provided on the front face of the electronic device 1 to be partially exposed to the outside of the electronic device 1. According to one embodiment, the key button may serve as a home button. Although not denoted by reference numerals, according to one embodiment, one or more different physical key buttons may be provided on a side face of the electronic device 1 to be exposed through a case frame 7. According to one embodiment, the key buttons may serve as, for example, a volume up/down button and a wake-up button. Although not illustrated, other various mechanical structures may be provided.

According to various embodiments of the present invention, a transmission line (Tx line) of the touch panel of the touch screen device 10 may be arranged in the peripheral region of the speaker device 2, and a Display Driver IC (DDI) region of the display module may be arranged in a region that generally overlaps with the Tx line. Such regions act as main noise sources of the touch screen device 10, and the performance of peripheral components may be degraded by the noise sources.

For example, clock and frequency multiplication components are likely to be radiated from such noise sources of the touch screen device 10, and the radiated noise may act as Electro-Magnetic Interference (EMI) radiation, thereby causing the performance degradation of peripheral electronic components. Such noise may cause the degradation of the driving performance of electronic components disposed therearound (e.g., an antenna module for FM radio broadcasting reception or an LCD unit).

Therefore, according to various embodiments of the present invention, a peripheral ground region may be expanded in order to block the noise generated from the noise sources from being radiated to peripheral electronic components. According to one embodiment, the noise source region may be blocked by being surrounded by the peripheral ground region. According to one embodiment, the noise source region may be configured to be controlled within a closed-loop region by the peripheral ground region. According to one embodiment, the radiation of noise generated from a noise source may be blocked by arranging ground regions at the opposite ends of the noise source, respectively.

Figure 2:
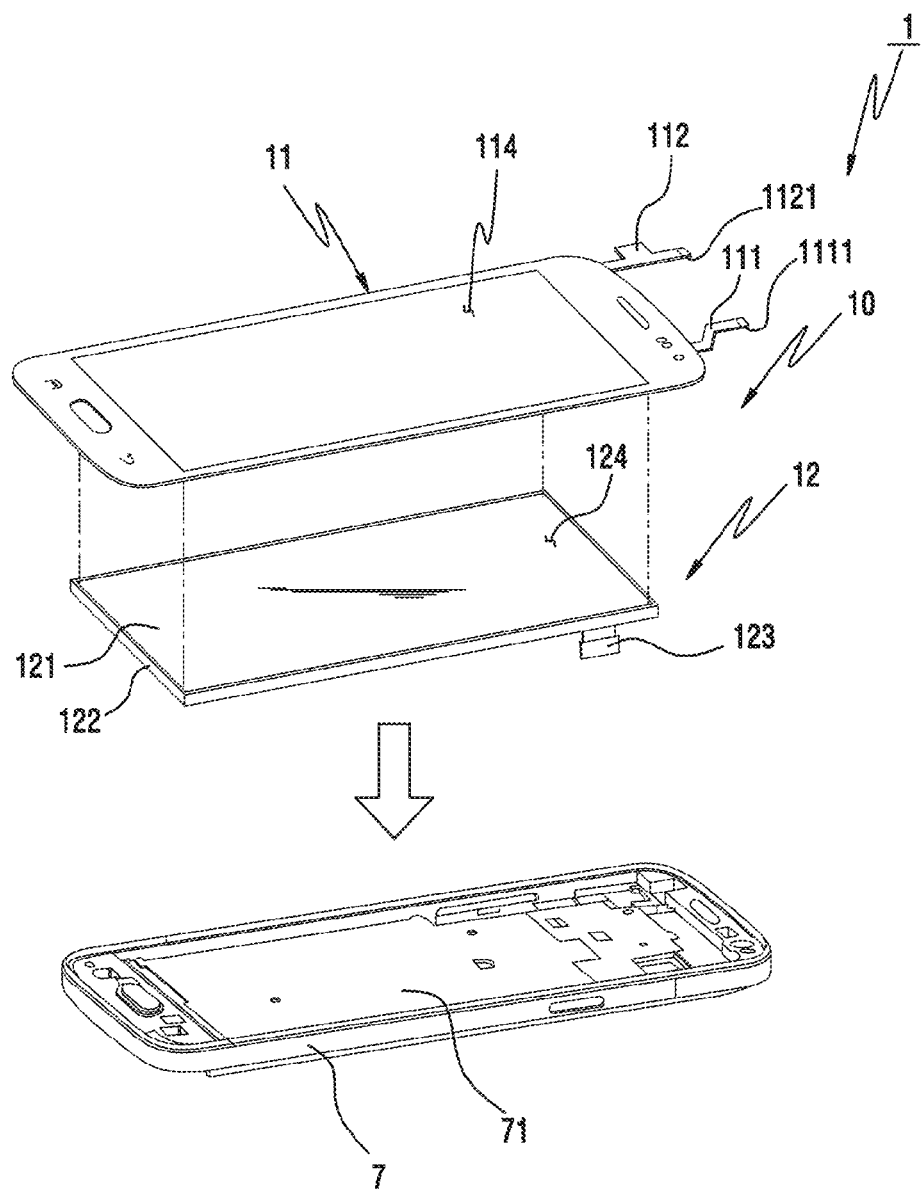
FIG. 2 is an exploded perspective view illustrating a state in which a touch screen device according to one embodiment of the present invention is installed in an electronic device.

FIG. 2 is an exploded perspective view illustrating a state in which a touch screen device according to one embodiment of the present invention is installed in an electronic device.

Referring to FIG. 2, the touch screen device 10 of the electronic device 1 may be composed of a touch panel 11 and a display module 12. According to one embodiment, the touch panel 11 and the display module 12 may be configured as the touch screen device 10 by being attached to each other, and the touch screen device 10 assembled as a single device may be mounted on a mounting portion 71 of a case frame 7.

According to one embodiment, the touch panel 11 may include a display region and a BM region on the front face 114 thereof, and the display region may be formed in a size that is capable of accommodating the display module 12. Although not illustrated, the touch panel 11 may be implemented by attaching an Indium Tin Oxide (ITO) film having a plurality of electrode nets to the rear face of a window made of FET or glass or by depositing such electrode nets on the rear face of a window.

According to one embodiment, the display module 12 may be provided as a Liquid Crystal Display (LCD). In such a case, the display module 12 may include a control unit configured to control the LCD, a video memory configured to store image data, and an LCD element. According to one embodiment, the display module 12 may also be provided in an Organic Light Emitting Diode (OLED) display type or any other display type.

According to one embodiment, the touch panel 11 may transmit a driving signal to the display module 12. Accordingly, a first connecting portion 111 may be provided to extend at one side of the touch panel 11 to be electrically connected to the display module 12. According to one embodiment, the first connecting portion 111 is preferably constituted with a Flexible Printed Circuit (FPC), and a first connection connector 1111 may be provided at one end of the first connecting portion 111 to be connected to a board 13 (see FIG. 3) of the display module 12.

According to one embodiment, the touch panel 11 may be provided with a second connecting portion 112 at a position spaced apart from the first connecting portion 111 by a predetermined interval in the same manner as the first connecting portion 111. The second connecting portion 112 may also be implemented by an FPC, and a second connection connector 1121 may be further provided at an end of the second connecting portion 112 to be electrically connected to the board 13 of the display module 12. According to one embodiment, one end of the second connecting portion 112 may be electrically connected to a ground line of the touch panel 11, and the other end may be electrically connected to a ground portion of the display module 12.

According to one embodiment, the first connecting portion 111 may serve as a signal line to transmit a driving signal between the touch panel 11 and the display module 12, and may include a ground line. According to one embodiment, the second connecting portion 112 may serve as a ground line to electrically connect the ground line of the touch panel 11 and the ground portion of the display module 12 to each other.

According to one embodiment, a noise source of the touch screen device 10 may be arranged between the first connecting portion 111 and the second connecting portion 112. According to one embodiment, the second connecting portion 112 may be implemented by blocking the radiation of noise by being provided at a position that allows the noise source to be arranged between the first connecting portion 111 and the second connecting portion 112, and adjacent to the noise source.

According to one embodiment, the display module 12 may be configured such that the greater portion of the Liquid Crystal Display (LCD) unit 121, except for the front face 124, is surrounded by the metal-made reinforcement plate 122. According to one embodiment, the reinforcement plate 122 may prevent, in advance, the LCD module from being damaged by being provided to surround all of the rear face and the side faces of the LCD unit 121. According to one embodiment, as the LCD unit 121, a high-pixel TFT LCD unit may be used. According to one embodiment, as the LCD unit 121, a flexible LCD unit made of a film may be used.

According to one embodiment, a third connecting portion 123 may be provided on the display module 12 to be electrically connected to a main board (not illustrated) on which the mounting portion 71 of the case frame 7 is disposed. According to one embodiment, the third connecting portion 123 may be configured to transmit a driving signal of the touch panel 11 to the main board, or to transmit a display signal from the main board to the display module 12.

FIG. 3 illustrates configurations of rear faces of a touch panel and a display module in a touch screen device according to one embodiment of the present invention.

Figures 3A, 3B:
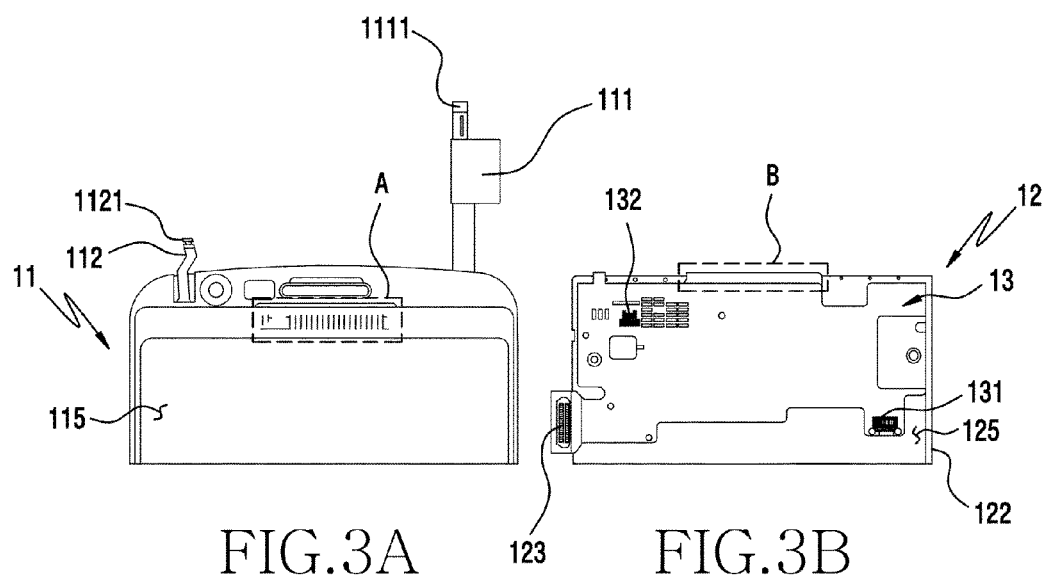
FIG. 3 illustrates configurations of rear faces of a touch panel and a display module in a touch screen device according to one embodiment of the present invention.

Referring to FIG. 3, FIG. 3(a) illustrates a configuration of the rear face 115 of the touch panel 11, and FIG. 3(b) illustrates a configuration of the rear face 125 of the display module 12.

Referring to FIG. 3(a), at the center of the upper end of the touch panel 11, a Tx line region A having a predetermined length may be disposed in the widthwise direction of the touch panel 11. Such a Tx line region is a region where radiation noise is generated by multiplication components of a data scan frequency received from the plurality of electrode nets of the touch panel 11.

According to one embodiment, the first and second connecting portions 111 and 112 for electric connection with the display module 12 may be arranged at opposite sides of a region A, respectively, which is the above-described noise generating region. According to one embodiment, the first and second connecting portion 111 and 112 may be electrically connected to each other at the upper side of the region A of the touch panel 11. According to one embodiment, the first connecting portion 111 may be electrically connected to the signal line and the ground line of the touch panel 11, and the second connecting portion 112 may be electrically connected to the ground line of the touch panel 11.

Referring to FIG. 3(b), on the rear face 125 of the display module 12, a board 13 may be disposed to be electrically connected to the LCD unit 121. According to one embodiment, the board 13 may be a Flexible Printed Circuit Board (FPCB). According to one embodiment, the board 13 may be a hard-type board. According to one embodiment, the board 13 may be a hard-type board electrically connected to the LCD unit by a flexible printed circuit. According to one embodiment, in the case where the board 13 is implemented by an FPCB, the FPCB is bent in the upper end portion of the LCD unit 121 to be attached to the rear face 125 of the display module 12 (i.e. at least a portion of a surface of the reinforcement plate 122).

According to one embodiment, the ground region of the display module 12 may be a ground region of the board 13. According to one embodiment, the ground region of the display module 12 may include a ground region of the board 13 and a region of the metal-made reinforcement plate 122 connected to the ground region of the board 13.

According to one embodiment, a first connector port 131 and a second connector port 132 may be disposed on the board 13 to be spaced apart from each other by a predetermined interval. When the touch panel 11 and the display module 12 are assembled such that the rear face 115 of the former and the front face 124 of the latter face each other, the first connector port 131 may accommodate a first connection connector 1111 of the first connecting portion 111, which bypasses the end of the touch panel 11. When the touch panel 11 and the display module 12 are assembled such that the rear face 115 of the former and the front face 124 of the latter face each other, the first connector port 132 may accommodate a second connection connector 1121 of the second connecting portion 112, which bypasses the end of the touch panel 11.

According to one embodiment, a DDI region B is also positioned at the upper side of the display module 12 so that the DDI region B may act as a noise source of the display module 12. Accordingly, the DDI region B may also be disposed between the first and second connecting portions 111 and 112 of the touch panel 11.

Figure 4:
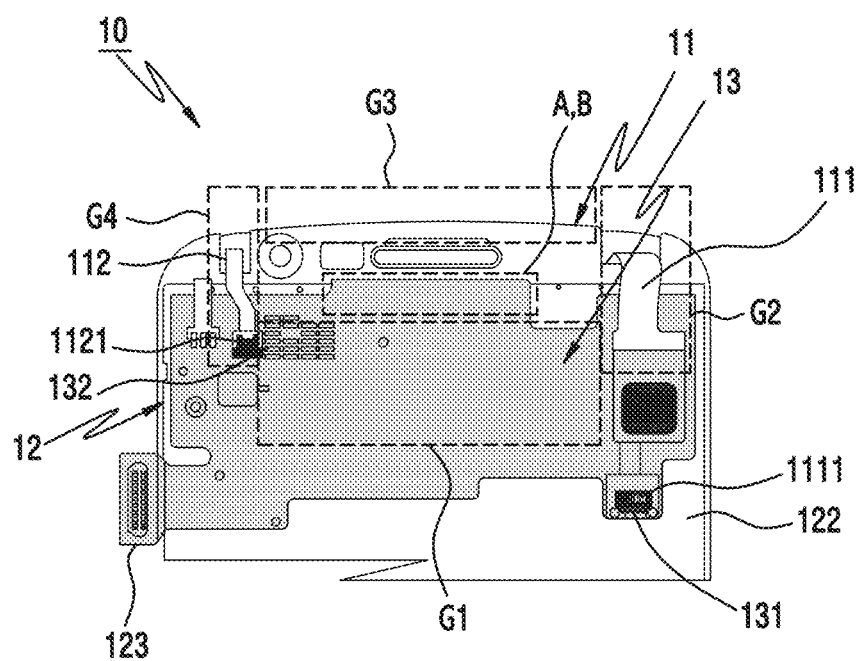
FIG. 4 illustrates a configuration of a main part in a state where a touch screen device according to one embodiment of the present invention is coupled.

FIG. 4 illustrates a main configuration in a state where a touch screen device according to one embodiment of the present invention is coupled.

Referring to FIG. 4, the touch panel 11 and the display module 12 may be assembled to each other by bonding non-active regions to each other, in which the non-active regions are disposed along the rims thereof, respectively. According to one embodiment, the touch panel 11 and the display module 12 may also be assembled such that the rear face 115 of the former and the front face 124 of the latter face each other. In such a case, the first connecting portion 111 of the touch panel 11 may bypass the end portion of the touch panel 11 and may be electrically connected, via the first connection connector 1111, to the first connector port 131 of the board 13 disposed on the rear face 125 of the display module 12. According to one embodiment, in such a case, the second connecting portion 112 of the touch panel 11 may bypass the end portion of the touch panel 11 and may be electrically connected, via the second connection connector 112, to the second connector port 132 of the board 13 disposed on the rear face 125 of the display module 12.

According to one embodiment, the Tx line region A of the touch panel 11 and the DDI region B of the display module 12, which are the noise sources of the touch screen device 10, may be arranged to be surrounded by peripheral ground regions with the help of the electrical connection between the touch panel 11 and the display module 12 as described above.

According to one embodiment, the regions A and B, which are the noise generating regions of the touch screen 10, may be disposed to be surrounded by: a first ground region G1 formed by the board 13 and the reinforcement plate 122; a second ground region G2 formed as the first connecting portion 111 of the touch panel 11 is electrically connected by the first connection connector port 131 of the display module 12; a third ground region G3 formed by the first connecting portion 111 and the second connecting portion 112 of the touch panel 11; and a fourth ground region G4 formed as the second connecting portion 112 of the touch panel 11 is electrically connected by the second connection connector port 132 of the display module 12. Accordingly, since the noise generating regions (regions A and B) are disposed within a closed loop region formed by a plurality of ground regions G1, G2, G3, and G4, the noise radiated from the region A and/or the region B may be blocked from affecting the peripheral components. That is, when the electric length of the closed loop is remarkably shorter than the wavelength of an interest frequency, the effect may increase.

Although not illustrated, according to various embodiments of the present invention, the second connecting portion 112 of the touch panel 11, which is configured to form the additional ground region G4, may be electrically connected to various ground portions that may be provided to the electronic device 1 without being limited to the ground region of the display module 12. According to one embodiment, such ground portions may be disposed on the inner face of the case frame of the electronic device, may be a ground portion of the main board that is provided to be spaced apart from the display module, or may be various metallic mechanical structures included in the electronic device.

It will be apparent to those skilled in the art that various modifications and changes falling within the scope of the appended claims may be made in these embodiments. In other words, the embodiments may be implemented in a very variety of ways without departing from the sprit and scope of the present invention as defined by the appended claims.

The invention claimed is:

1. An electronic device comprising:
 a touch screen device including a noise source;
 a first connecting portion disposed at one side of the noise source, and grounded to a first ground portion; and
 a second connecting portion disposed at another side of the noise source such that the noise source is interposed therebetween, and grounded to a second ground portion,
 wherein a first ground region is formed by the first connecting portion, and a second ground region is formed by the second connecting portion.

2. The electronic device of claim 1, wherein the first connecting portion and the second connecting portion are electrically connected to each other to form a third ground region at an upper side of the noise source.

3. The electronic device of claim 2, wherein the first ground portion and the second ground portion are the same ground portion disposed on the touch screen device or electrically connected ground portions.

4. The electronic device of claim 1, wherein the touch screen device includes a touch panel and a display module coupled to the touch panel.

5. The electronic device of claim 4,
 wherein the first connecting portion comprises a flexible printed circuit (FPC) including a ground line and a signal transmission line that are formed to be drawn out from the touch panel, and
 wherein the first ground portion comprises a ground portion of the display module.

6. The electronic device of claim 5, wherein the ground portion of the display module comprises a ground portion of a board that is electrically connected to the display module.

7. The electronic device of claim 6, wherein the display module further includes a metal-made reinforcement plate that is provided to at least partially surround an LCD unit, and the ground portion is expanded to the reinforcement plate.

8. The electronic device of claim 5, wherein the second connecting portion comprises a flexible printed circuit that is drawn out from the touch panel, one end of the flexible printed circuit being electrically connected to the ground line of the touch panel, and another end being electrically connected to the ground portion of the display module.

9. The electronic device of claim 5,
wherein the second connecting portion comprises a flexible printed circuit that is drawn out from the touch panel, one end of the flexible printed circuit being electrically connected to the ground line of the touch panel and another end being electrically connected to a ground portion provided in the electronic device.

10. The electronic device of claim 4, wherein the noise source comprises at least one of a transmission (Tx) line region of the touch panel, a DDI (Display Driver IC) region of the display module, or a combination thereof.

11. The electronic device of claim 1, further comprising:
an electronic component comprising at least one of a FM radio reception module, an LCD unit, or a combination thereof.

12. The electronic device of claim 1, wherein the second connecting portion is disposed as close as possible to the noise source.

13. An electronic device comprising:
an electronic component including a noise source;
a first connecting portion disposed at one side of the noise source, and grounded to a first ground portion; and
a second connecting portion disposed at another side of the noise source such that the noise source is interposed therebetween, and grounded to a second ground portion,
wherein a first ground region is formed by the first connecting portion, and a second ground region is formed by the second connecting portion.

14. The electronic device of claim 13, wherein the noise source is arranged to be surrounded by a ground region that is formed by a first connecting portion connected to the first ground portion and a second connecting portion connected to the second ground portion.

15. The electronic device of claim 13, wherein the electronic component includes a touch panel and a display module coupled to the touch panel.

16. The electronic device of claim 13, wherein the noise source comprises at least one of a transmission (Tx) line region of the touch panel and a DDI (Display Driver IC) region of a display.

17. The electronic device of claim 13, wherein the electronic component comprises at least one of an antenna module for FM radio broadcasting reception and an LCD unit.

18. An electronic device comprising:
a touch panel including a first noise source;
a display including a second noise source, and coupled with the touch panel;
a first connecting portion disposed at one side of the touch panel, and grounded to a ground portion of the display; and
a second connecting portion disposed at the other side of the touch panel such that the second connecting portion is interposed between the first noise source and the second noise source, and grounded to a second ground portion of the display,
wherein a first ground region is formed by the first connecting portion, and
wherein a second ground region is formed by the second connecting portion.

19. The electronic device of claim 18,
wherein the first noise source includes a transmission (Tx) line region of the touch panel, and
wherein the second noise source includes a DDI (Display Driver IC) region of the display.

* * * * *